US006241039B1

(12) United States Patent
Järnström et al.

(10) Patent No.: US 6,241,039 B1
(45) Date of Patent: Jun. 5, 2001

(54) ARRANGEMENT FOR FIRMLY LOCKING AN ENGINE BONNET TO A VEHICLE CAB

(75) Inventors: Sune Järnström; Leif Malmquist, both of Södertälje (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/490,824

(22) Filed: Jan. 25, 2000

(51) Int. Cl.[7] .................................................... B62D 25/10
(52) U.S. Cl. ........................ 180/69.21; 292/340; 292/216
(58) Field of Search ............................ 180/69.23, 69.22, 180/69.21; 49/394, 503; 292/340, 341.12, 216, DIG. 53, 341.13, 341.18, 341.15

(56) References Cited

U.S. PATENT DOCUMENTS 4,165,112 * 8/1979 Kleefeldt .............................. 292/216
4,388,976 6/1983 Williams et al. .................. 180/69 R
4,981,313 * 1/1991 Makamura ........................... 292/340
5,529,356 * 6/1996 Cetnar .................................. 292/340
5,826,672 10/1998 Holter et al. ...................... 180/69.21
5,890,556 * 4/1999 Shearn et al. ..................... 180/69.21

FOREIGN PATENT DOCUMENTS 0314075 5/1989 (EP) .
2498238 7/1982 (FR) .

* cited by examiner

*Primary Examiner*—Brian L. Johnson
*Assistant Examiner*—Elaine Gort
(74) *Attorney, Agent, or Firm*—Ostrolenk, Faber, Gerb & Soffen, LLP

(57) ABSTRACT

An arrangement for locking an engine bonnet firmly to a vehicle cab for reducing stresses on the bonnet and on the locking arrangement. The arrangement includes a first locking part fastened to the cab and a second locking part fastened to the bonnet. The first part includes a spindle supported between arms of a yoke. Facing convex dished guide surfaces at least one of which is resilient are disposed at the spindle. The receiving portion on the cab has two spaced apart plates each with a recess in it for receiving the spindle extending across them. The plates are placed so that the dished guide surfaces on the yoke of the receiving portion are engaged with the plates for guiding the spindle into the recess and for holding them against relative motion.

14 Claims, 5 Drawing Sheets

ARRANGEMENT FOR FIRMLY LOCKING AN ENGINE BONNET TO A VEHICLE CAB

BACKGROUND OF THE INVENTION

The present invention relates to an arrangement for firmly locking an engine bonnet or hood to a vehicle cab and to the elements which guide the locking together and reduce the effects of relative motion between the bonnet and the cab.

STATE OF THE ART

There are at present two main types of heavy-duty trucks, the so-called cab-over-engine type, wherein the engine is largely arranged beneath a cab which is tiltable forwards, and the so-called torpedo type with its cab fastened to the frame and with the engine largely arranged in front of the cab in an engine space which is covered by an engine bonnet. The torpedo type has an engine bonnet with a front edge that is firmly arranged on the vehicle frame. The bonnet is often tiltable forwards about a transverse hinge pin which is arranged as far forward as possible on the vehicle at the lower front edge of the bonnet. The bonnet is locked firmly to the cab by a catch at the rear edge of the bonnet.

Secure locking between the cab and the bonnet has hitherto been achieved by using a two-part locking arrangement comprising one part fastened to the bonnet and one part fastened to the cab. The part fastened to the bonnet consists of a metal retainer provided with a pin placed in the transverse direction of the bonnet, and the part fastened to the cab consists of a gripping arrangement with a gripping claw intended to grip round the pin and be locked firmly to it. The gripping claw is connected to a wire which leads to a manual control in the cab. Pulling on the manual control unlocks the gripping claw and makes it possible to open the bonnet. The result is an easily operable and reliable lock between the cab and the bonnet.

A truck cab is often entirely suspended relative to the vehicle frame in order to increase comfort in the cab and make it possible to raise and lower the position of the cab. When the vehicle is in motion, the cab moves up and down in a vertical direction as a result of the suspension. The bonnet, however, has its front edge firmly arranged on the vehicle frame and its rear end firmly locked to the cab. The bonnet of a heavy-duty truck is large and heavy and may weigh about 100 kg, which gives rise to large forces. When the cab moves vertically, stresses occur in the bonnet in its longitudinal direction because the rear end of the bonnet, being locked, follows movements of the cab, whereas the front edge of the bonnet is fastened to the frame. This produces stresses in the front edge of the bonnet which can gradually lead to cracks.

Another problem which arises when the cab springs vertically and the bonnet is thereby moved is that this causes vibrations which propagate to the cab. This creates a considerable comfort problem for the driver, who often spends a large part of his working day in the cab.

The known locking arrangement is further equipped with a guide device to facilitate the introduction of the part of the locking arrangement which is fastened to the bonnet into its part which is fastened to the cab. This guide device consists of two dished metal washers which are threaded on the transverse pin of the metal retainer. These washers guide the metal retainer correctly into the gripping arrangement. A problem with these washers is that they may cause rattling in the locking arrangement. This noise may be disturbing for the driver and thereby diminish comfort in the cab.

SUMMARY OF THE INVENTION

The object of the invention is to eliminate the above disadvantages and to provide, with a view to reliable and readily operable firm locking of an engine bonnet to a vehicle cab, a new type of arrangement which increases comfort in the cab and reduces the strength forces in the bonnet. The present invention comprises an arrangement for locking an engine bonnet firmly to a vehicle cab, reducing stresses on the bonnet and on the locking arrangement. The arrangement includes a first locking part fastened to the cab and a second locking part fastened to the bonnet. The first part includes a spindle supported between arms of a yoke. Facing convex dished guide surfaces, at least one of which is resilient are disposed at the spindle. The receiving portion on the cab has two spaced apart plates each with a recess in it for receiving the spindle extending across them and the plates are so placed that the dished guide surfaces on the yoke of the receiving portion are engaged with the plates for guiding the spindle into the recesses and for holding them against relative motion.

Making one part of a two-part locking arrangement resilient makes the movements of the bonnet more flexible. The resilient part absorbs the stresses which occur when the cab moves relative to the bonnet. This reduces the stresses in the bonnet and therefore reduces the risk of cracks in the bonnet. Vibrations are also reduced, which increases comfort in the cab.

Rattling in the locking arrangement is eliminated by one guide device being an integral part of one part of the locking arrangement and the other guide device being a washer provided with a thick rubber element. Driver comfort is improved.

DESCRIPTION OF AN EMBODIMENT

Figure 1:
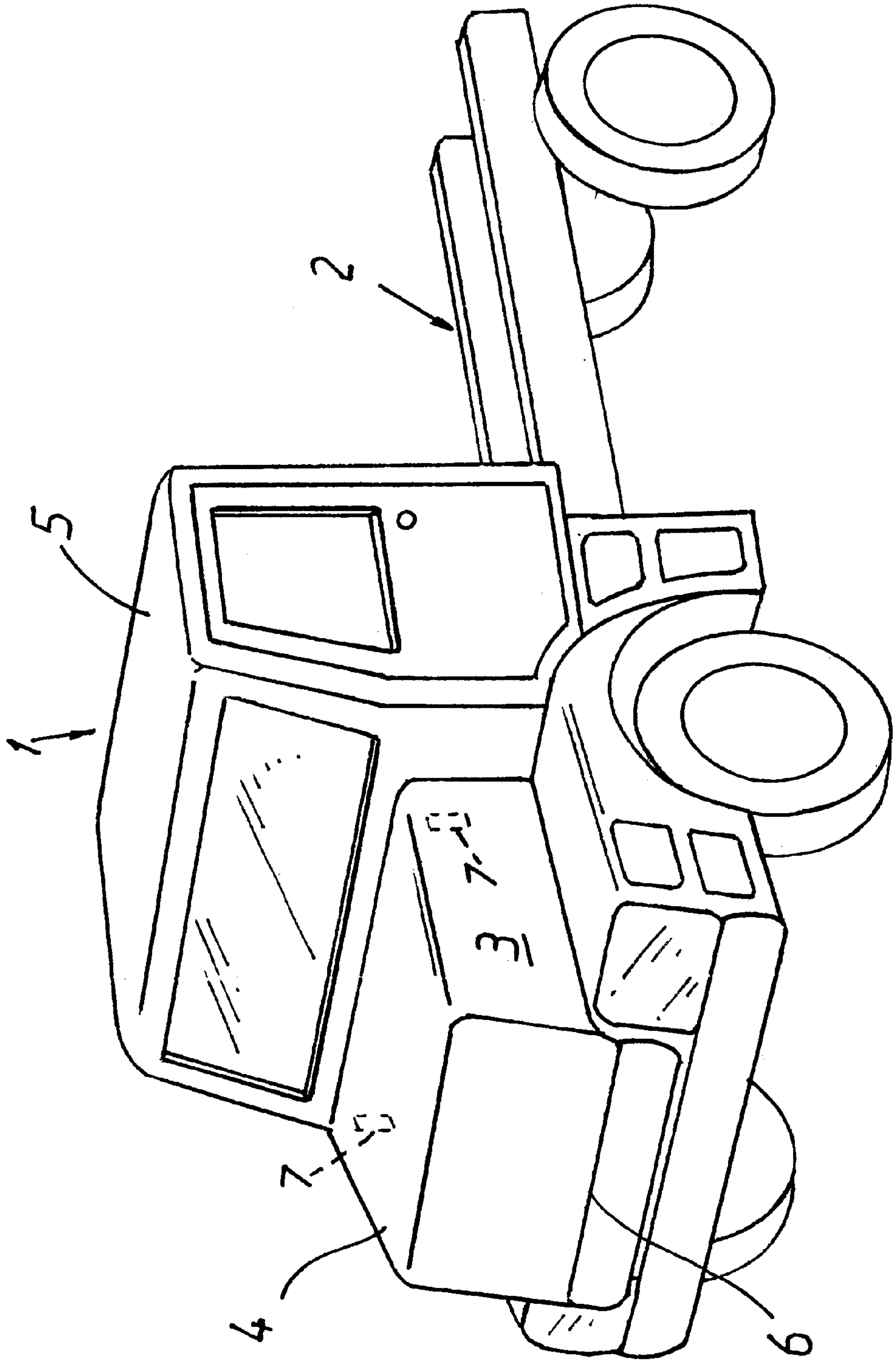
FIG. 1 shows a schematic view of a so-called torpedo-style truck.

FIG. 1 depicts a so-called torpedo-style truck 1 which has its engine (not depicted) arranged on a vehicle frame 2 in an engine space 3. The engine space 3 is covered by an engine bonnet 4 which is tiltable forwards to provide access to items in the engine space 3 for servicing or other attention. A driving cab 5 is arranged on the vehicle frame 2 to the rear of the engine space 3 and the engine bonnet 4. The driving cab 5 may have its rear edge and its front edge, or only its rear edge, resiliently suspended on the frame.

The engine bonnet 4 is arranged for tilting relative to the frame 2 about a spindle extending substantially in the transverse direction of the vehicle and situated at the lower front edge 6 of the bonnet 4. The rear end of the bonnet 4 is locked to the cab 5 by two catches 7. Each catch 7 is comprised of a part fastened to the bonnet and a part fastened to the cab, which parts cooperate with one another. To allow tilting of the bonnet 3, the catches 7 may be opened by means of a manual control (not depicted) situated in the cab 5. Thereafter the bonnet 4 is tilted forwards.

Figure 2:
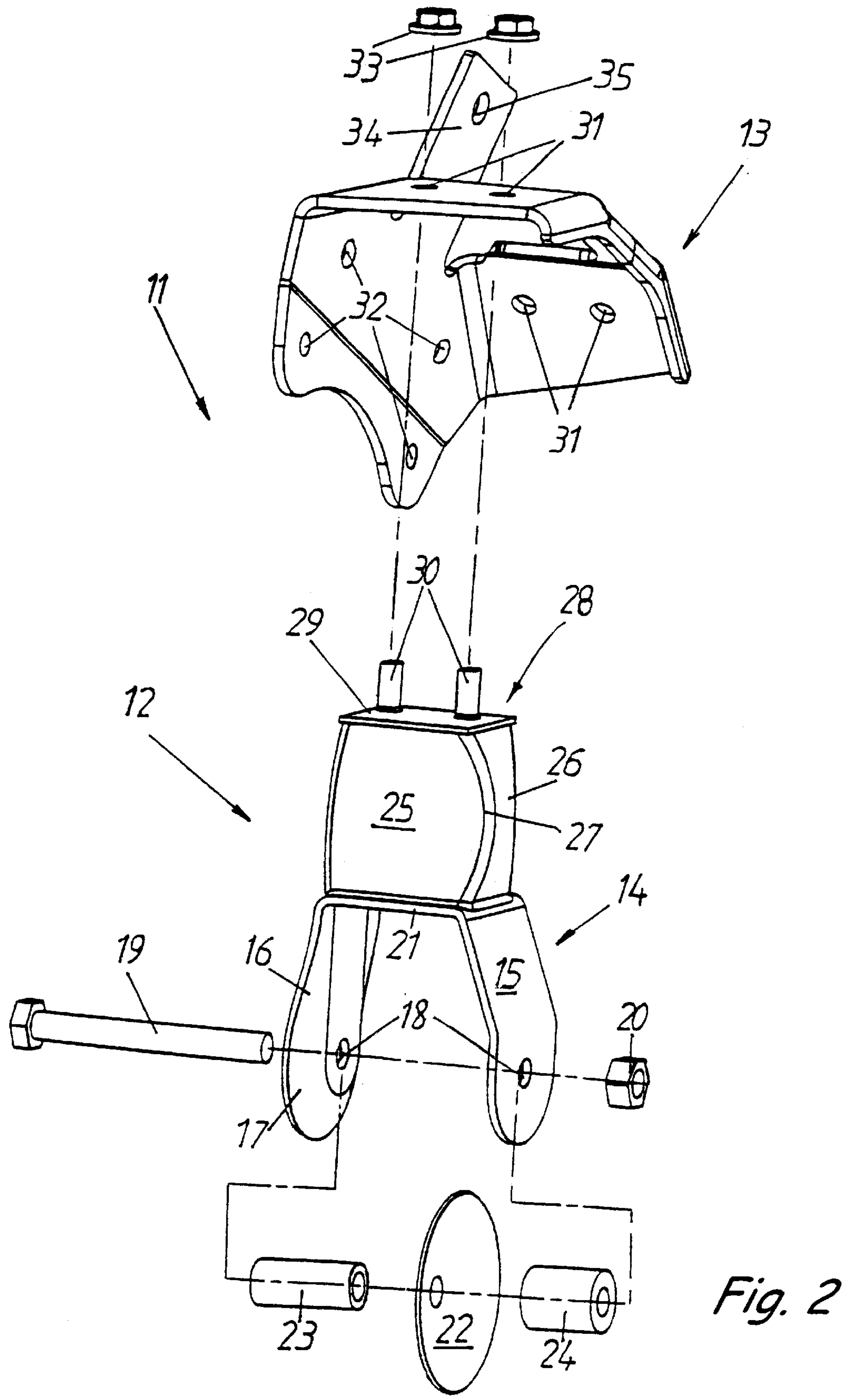
FIG. 2 is an exploded view of the one part of the locking arrangement according to the invention.

FIG. 2 shows an exploded drawing of one part 11 of the two-part locking arrangement 7. This part of the locking arrangement 7 is comprised of a receiving portion 12 and a fastening bracket 13. The receiving portion 12 incorporates a lock spindle section 14, an intermediate section 25 and a fastening section 28. The lock spindle section 14 incorporates a lock spindle device 19 which is intended to cooperate with the other part of the locking arrangement. In the version depicted in FIG. 2 of the lock spindle section, the latter incorporates a U-shaped yoke 14 with two limbs 15, 16 and, situated between the latter, a central portion 21. The end section of one of the limbs 16 has a dished surface 17. The surface 17 is convex in the direction facing the other limb 15.

The lower portion of each of the limbs 15, 16 is provided with a hole 18. These holes 18 are intended to accommodate a lock spindle device 19, here in the form of a bolt, transverse to the vehicle's longitudinal symmetry plane. The bolt 19 can be pushed through the two limbs 15, 16 of the yoke 14 and thereafter fastened with a nut 20. A washer 22 and two tubular spacing elements 23, 24 can be threaded on the section of the bolt 19 which is intended to be situated between the limbs 15, 16 of the yoke. The washer 22 and the spacing elements 23, 24 are threaded on at the same time as the bolt 19 is inserted through the one hole 18 and out through the other. The spacing elements 23,24 are placed on either side of the washer 22 and keep the washer 22 a certain distance (a) away from the dished limb 16. The washer 22 is also dished and is convex towards the limb 16 which has the dished surface 17. The washer 22 and the limb 16 which has the dished surface form together a guide device. The washer 22 in FIG. 2 is circular but may also be of other shapes.

The intermediate section 25 of the receiving portion is fastened to the top of the central part 21. This intermediate section 25 is resilient and consists of a block of rubber. It is also possible to conceive of using other resilient arrangements such as coil springs, blocks of other elastic materials, etc. The rubber block 25 has convex outer edges 26 as seen transverse to the longitudinal direction of the bolt 19, and an inward-curving waist 27 as seen in the longitudinal direction of the bolt. This shape means that the intermediate section is flexible at the waist to rotational movement of the lock spindle section 14, in a plane parallel with the longitudinal direction of the vehicle, relative to the fastening section 28, but not flexible to movement perpendicular to that plane. This means that when the receiving portion 12 is fitted with the bolt 19 transverse to the forward direction of the vehicle, the elastic intermediate section can absorb the forces which occur in the longitudinal direction of the bonnet when the cab moves vertically, while at the same time the lock between the bonnet and the cab is stable in the lateral direction.

Figure 3:
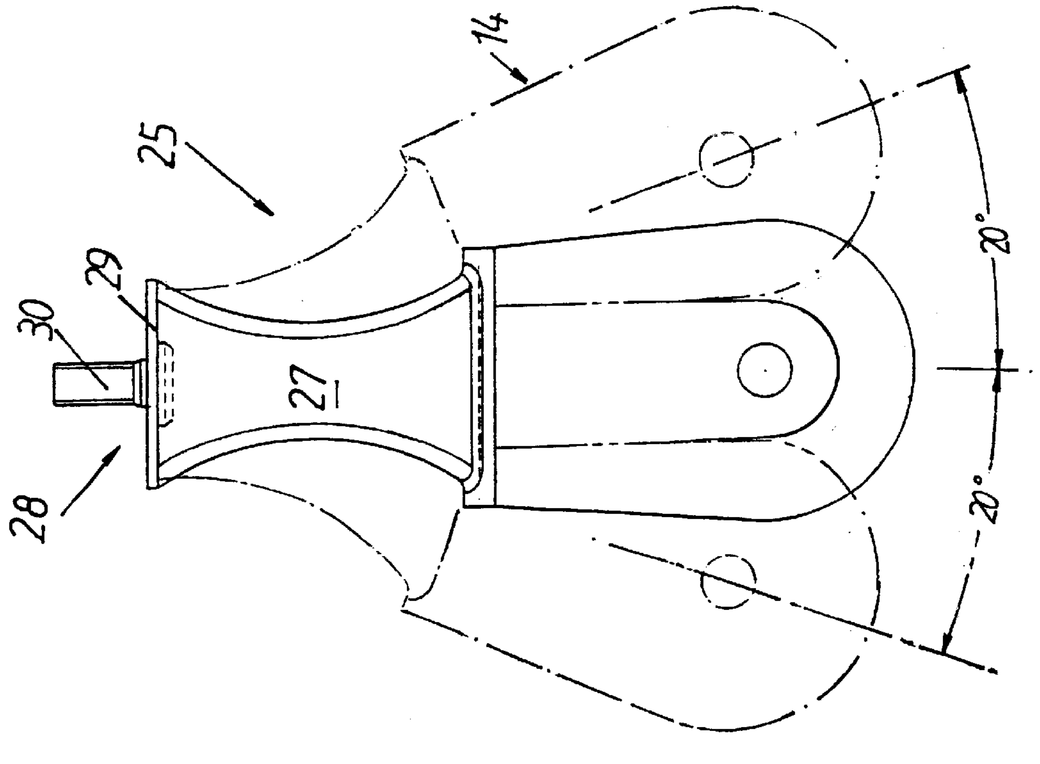
FIG. 3 shows in detail the resilient element of the locking arrangement.

FIG. 3 shows in detail the receiving portion with the resilient intermediate section 25 seen from the side. The inward-curving waist 27 enables the intermediate section 25 to move at least 20° to right and left in the plane of the diagram. The intermediate section is not movable perpendicular to that direction. FIG. 2 further depicts the fastening section 28 firmly secured on top of the intermediate section 25. The fastening section 28 consists of a rectangular plate 29 and two studs 30. The area of the plate 29 is approximately the same size as the upper surface of the intermediate section 25.

The receiving portion 12 may be fastened to the vehicle, advantageously to its engine bonnet, by means of an angled fastening bracket 13. The fastening bracket 13 is provided with a sheetmetal holed fastening protrusion 34 and is also provided with a multiplicity of holes 31, 32. The holes 31 on the upper part of the fastening bracket 13 are intended for firm securing of the receiving portion 12 by means of the latter's studs 30 and two nuts 33. The hole 35 in the fastening protrusion and the holes 32 on the side sections of the fastening bracket 13 are intended for securing the fastening bracket 13 to the vehicle. The holes 31, 32 in the fastening bracket which are superfluous and not used for left placing according to FIG. 4 below are used instead in a corresponding manner for right securing of the fastening bracket, which means that identical brackets can be used on both the right and left sides of the vehicle. The hole 35 in the fastening protrusion is used in both right and left fitting of the fastening bracket 13.

Figure 4:
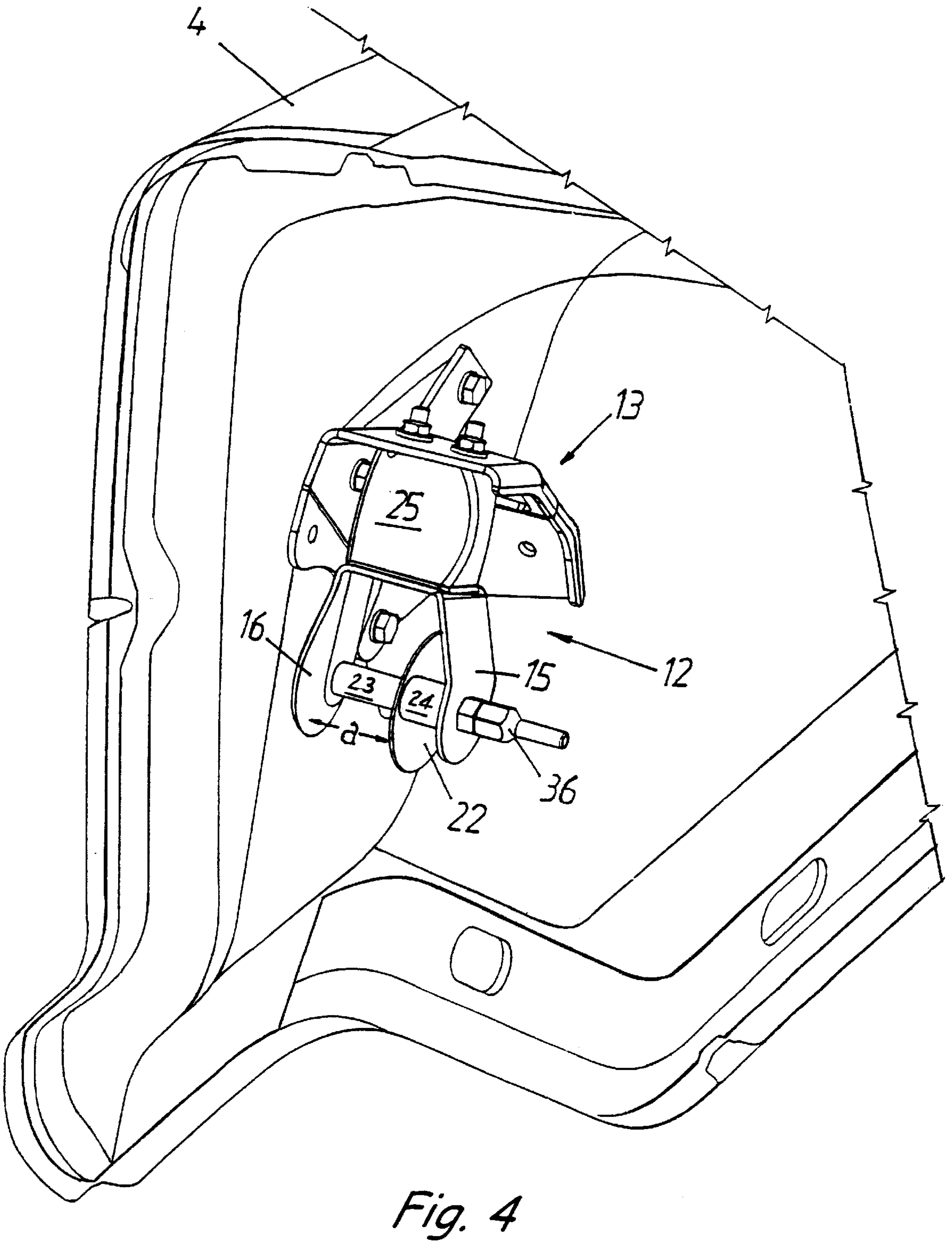
FIG. 4 shows the arrangement in FIG. 2 when fitted to the vehicle's engine bonnet.

FIG. 4 shows the resilient receiving portion 12 of the locking arrangement fitted by means of the fastening bracket 13 to the left side (in the forward direction of the vehicle) of an engine bonnet 4. In this diagram the guide washer 22 and its spacing elements 23, 24 are fitted at positions between the limbs 15, 16 of the U-shaped yoke. An alarm sensor 36 for theft/break-in alarm is fitted on the outer end of the bolt.

Figure 5:
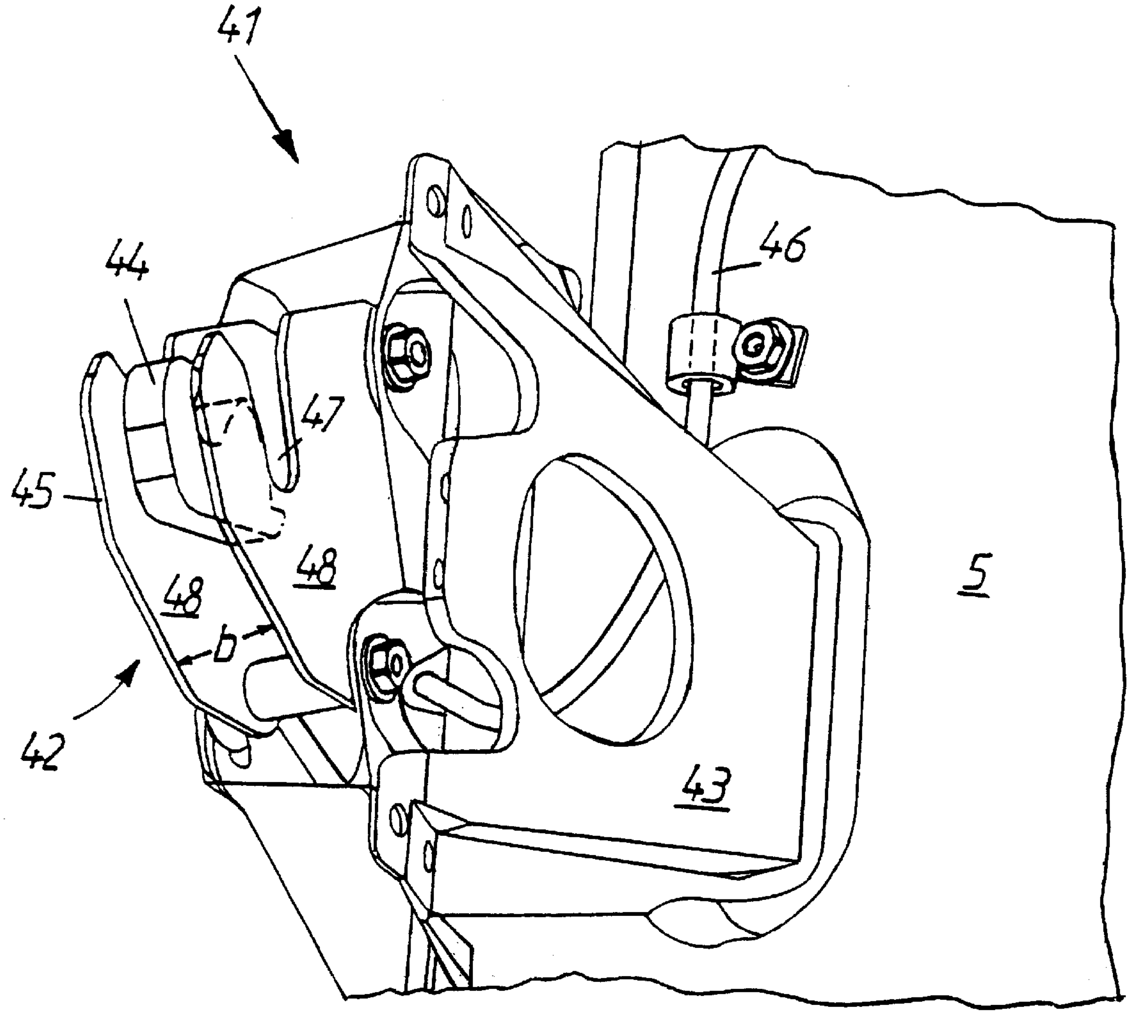
FIG. 5 shows the other part of the locking arrangement when fitted to the vehicle's cab.

FIG. 5 shows the other part 41 of the two-part locking arrangement 7, here shown fitted to a vehicle cab 5. This part 41 incorporates a gripping portion 42 which is secured to the cab 5 by means of a fastening arrangement 43. The gripping portion 42 cooperates with the receiving portion 12 to lock the bonnet 4 firmly to the cab 5. The gripping portion 42 incorporates a claw-like gripping device 44 and a retainer 45. The retainer is comprised of two identical plates 48 which are provided with recesses and are joined together centrally to one another with a certain distance (b) between them. The gripping device 44 is fastened between the plates 48. The recess 47 is arranged to accommodate the bolt 19 and is therefore dimensioned in a manner corresponding to the latter. The gripping portion 42 may be operated from the vehicle cab by a control arrangement incorporating a wire 46 which extends between the gripping portion 42 and the cab 5 and is connected to a manual control (not depicted) in the cab.

The cooperation between the gripping portion 42 and the receiving portion 12 functions in an already known manner. When the bonnet 4 is to be closed and locked firmly to the cab 5, the bolt 19 of the receiving portion is guided down into the recess 47 in the retainer by means of the receiving portion's guide device 17, 22. At the same time as the receiving portion 12 moves down into the recess 47, the claw-like gripping device 44 grips round the bolt 19, thereby locking the bonnet firmly to the cab.

The receiving portion 12 being resilient according to the present invention results in elastic locking which provides the bonnet 4 and the cab 5 with the possibility of moving relative to one another. The bonnet 4 is opened by pulling the wire, which results in the gripping device 44 releasing its locking grip round the bolt 19.

FIGS. 4–5 depict an embodiment in which the part of the locking arrangement which is fastened to the bonnet is resilient, but it is equally possible to conceive of the part fastened to the cab being made resilient, e.g. by fitting the receiving portion to the cab and the gripping portion to the bonnet.

Figure 6:
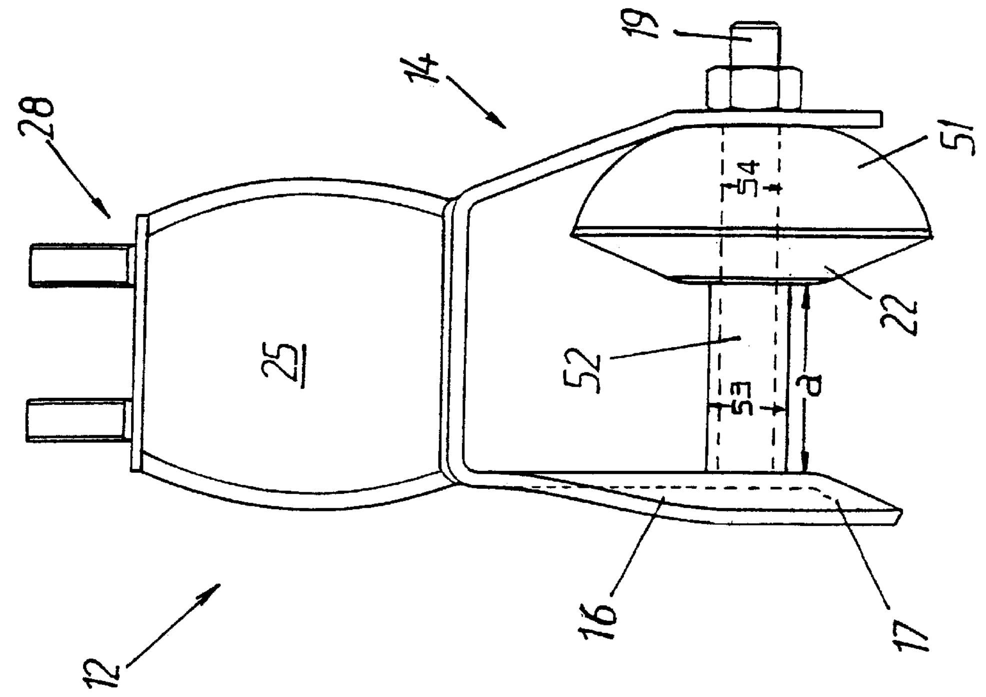
FIG. 6 shows a second embodiment of the locking arrangement.

FIG. 6 shows a second embodiment of the locking arrangement according to the invention. It depicts the receiving portion 12 in detail, and the items which have counterparts in the first embodiment have here the same reference notations. The U-shaped yoke 14, the intermediate section 25 and the fastening section 28 take the same form as already described in FIGS. 1–3. The peculiarity of this embodiment is that the washer 22, which during cooperation with a dished surface 17 of one limb guides the receiving portion 12 correctly into the gripping portion 42, is provided with an elastic element 51 on the rear of its dished surface.

The element 51 may consist of rubber vulcanised firmly to the washer 22. This element 51 acts as a spacing element and combines with the second spacing element 52 to keep the washer the correct distance (a) away from the dished limb 16. The second spacing element 52 is comprised of a tube with two different outside diameters 53, 54 which is threaded on the bolt 19. The total length of the tube 52 is equal to the distance between the limbs 15, 16, and the section with the smaller diameter 54 has the same length as the combined length of the washer 22 and the element 51. The washer 22 with the elastic element 51 is threaded on the section of the tube 52 which has the smaller diameter 54. The washer 22 and the element 51 are provided with holes which are of the same size as, or slightly larger than, the tube's smaller diameter 54 but smaller than its larger diameter 53. The washer 22 is thus checked by the section of the tube which has the larger diameter 53, and the washer 22 with attached element 51 is kept a certain distance (a) away from the limb which has the dished lower portion 16. The fact that the tube 52 is provided with two diameters reduces the number of loose parts which might rattle while the vehicle is in motion.

The distance (a) between the washer 22 and the dished limb 16 has to be somewhat smaller than the distance (b) between the two plates 48 of the gripping portion 42.

The elastic element 51 on the rear of the washer 22 makes it possible for the bolt 19 of the receiving portion to nevertheless slide down into the recess 47 in the gripping portion. Cooperation free from play is thus achieved between the receiving portion 12 and the gripping portion 42 and the risk of rattling is considerably reduced.

What is claimed is:

1. An arrangement for locking an engine bonnet to a vehicle cab, comprising:

a first locking arrangement part to be fastened to a vehicle cab, the first part is a receiving portion comprising a lock spindle supported on the receiving portion such that the lock spindle extends transverse to the forward direction of the vehicle cab;

a second locking arrangement part to be fastened to an engine bonnet, the second part is a gripping portion which grips the receiving portion for locking the first and second parts of the locking arrangement, the gripping portion having a recess defined therein oriented in the direction of extension of the lock spindle, and the recess being so positioned that with the locking arrangement in a locked position, the lock spindle is locked in the recess at the time of closing of the engine bonnet;

the receiving portion including a guide device shaped for engaging the gripping portion as the lock spindle is moved into the recess for guiding the lock spindle into the recess at the closing of the engine bonnet; the guide device comprising a first guide part on the receiving portion and a second guide part spaced from the first guide part and located on the lock spindle; and the gripping portion being shaped for cooperating with the first and second guide parts of the guide device for guiding the spindle into the recess;

the gripping portion includes first and second surfaces spaced apart along the direction of extension of the lock spindle and at the recess, the first and second surfaces being respectively at the first and second guide parts, so that the guide device is guided on the first and second surfaces of the gripping portion as the lock spindle moves into the recess, whereby the first and second parts enable engaging and releasable firm locking of the first and second parts to each other and thereby for locking the engine bonnet relative to the vehicle cab;

at least one of the first and second guide parts having a resilient portion of an elastic material wherein the elastic material is of such type and the resilient portion is so positioned and so shaped as to enable elastic resilient motion in a plane parallel with a longitudinal symmetry plane of the vehicle cab so that the resilient portion absorbs relative motion between the bonnet and the cab.

2. The arrangement of claim 1, wherein the first and second surfaces of the gripping portion face outwardly and are respectively engageable with the first and second guide parts for guiding the spindle into the recess.

3. The arrangement of claim 2, wherein the receiving portion includes a lock spindle section comprising a generally U-shaped yoke having two spaced apart limbs and the lock spindle extends to the limbs of the yoke.

4. The arrangement of claim 1, wherein the receiving portion includes a lock spindle section comprising a generally U-shaped yoke having two spaced apart limbs and the lock spindle extends to the limbs of the yoke.

5. The arrangement of claim 4, wherein the gripping portion includes a retainer comprised of two plates which are positioned with a distance between them and the plates each have a respective recess in them which together define the recess for the spindle, and the plates are so shaped and positioned that their respective recesses are positioned to orient the spindle across the moving direction of the vehicle.

6. The arrangement of claim 5, wherein the plates of the gripping portion are shaped and positioned to cooperate with the limbs of the yoke for guiding the spindle into the recess.

7. The arrangement of claim 6, wherein the limbs of the yoke are spaced far enough apart to position the plates between the limbs of the yoke as the spindle is installed in the recess.

8. The arrangement of claim 7, wherein the first part of the guide device comprises a dished element on one of the limbs of the yoke and the second part of the guide device comprises a dished washer which is situated at a distance from the first limb of the yoke; and spacing devices threaded on the spindle for positioning and spacing the second part of the guide device with respect to the first part.

9. The arrangement of claim 8, wherein the first element and the second dished washer of the gripping device are spaced apart a first distance along the spindle and the surfaces of the plates that are engaged by the first and second parts of the guide device are at a second distance apart greater than the first distance, whereby the first dished element and the second dished washer engage the plates as the spindle is installed in the recess.

10. The arrangement of claim 9, wherein at least one of the first dished element and second dished washer is sufficiently elastic and resilient for enabling the spindle to be installed in the recess as the first dished element and the second dished washer slide along the plates.

11. The arrangement of claim 10, wherein the second dished washer is faced with elastic material on at least one side which acts as a spacing device and the elastic material washer engages one of the limbs of the yoke.

12. The arrangement of claim 1, wherein the resilient portion of elastic material is on the receiving portion and incorporates an intermediate section made of elastic resilient material shaped to have an inwardly curving waist as seen in one direction and a convex outer contour in a direction perpendicular to the one direction, with the intermediate section being oriented so that its waist is so oriented that the intermediate section is movable at the waist portion in a plane parallel with the longitudinal direction of the vehicle but not perpendicular to that direction.

13. The arrangement of claim 1, further comprising a fastening bracket on the frame for fastening the receiving portion to the vehicle bonnet; and the gripping portion being fitted to the cab of the vehicle.

14. The arrangement of claim 13, wherein the fastening bracket is so shaped and has mounting holes therein for receiving fastening means so that identical washers can be used for fitting the mounting bracket on both the left and right sides of the bonnet with respect to the traveling direction of the vehicle.

* * * * *